Oct. 13, 1931.　　　F. PICKARD　　　1,827,608
OIL SALAD DRESSING MIXER
Filed July 21, 1928　　　2 Sheets-Sheet 1
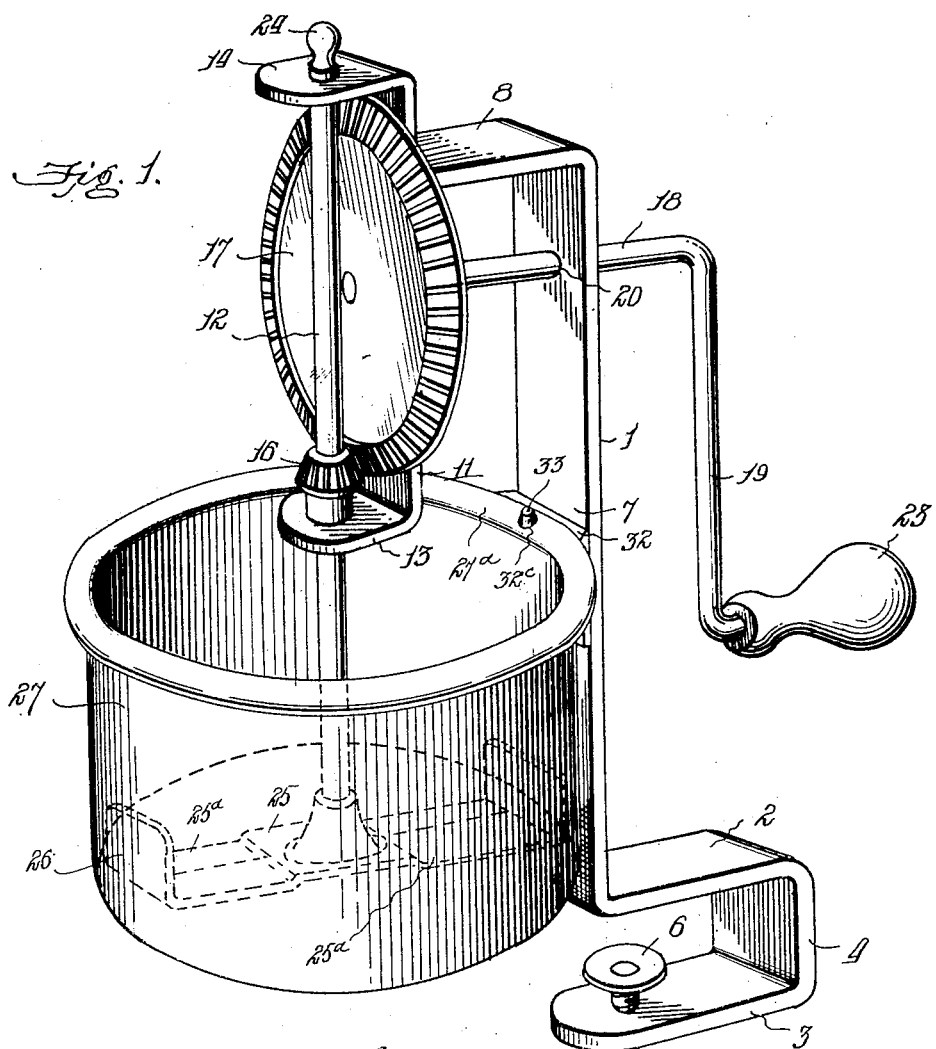
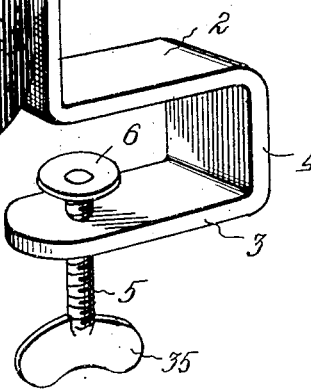
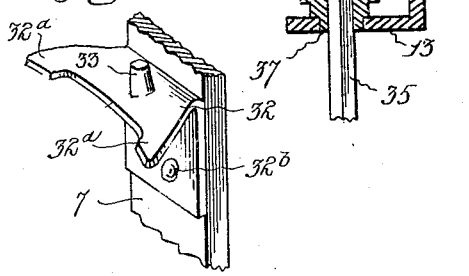
INVENTOR:
Frank Pickard.
BY
ATTORNEY.

Oct. 13, 1931.  F. PICKARD  1,827,608
OIL SALAD DRESSING MIXER
Filed July 21, 1928  2 Sheets-Sheet 2

INVENTOR:
Frank Pickard.
BY
ATTORNEY.

Patented Oct. 13, 1931

1,827,608

UNITED STATES PATENT OFFICE

FRANK PICKARD, OF HAVELOCK, NEBRASKA

OIL SALAD DRESSING MIXER

Application filed July 21, 1928. Serial No. 294,457.

My invention relates to new improvements in a mixer, especially that type used in mixing an oil salad dressing, and for whipping eggs, cream, etc.

It is an object of my invention to construct a mixer of the type described, that can be quickly secured to a table, enabling the operator to crank with one hand and leaving the other hand free for such necessary work as slowly adding oil, etc. To further carry out this object of my invention the mixing pan or bowl is secured to the mixer thereby eliminating the tendency for the same to turn with the mixing blade when mixing a viscous substance. Such a construction enables one to operate my mixer with ease and without the spilling and splashing of the substance during mixing, as is frequently the case when the mixer and likewise the pan is not rigidly secured.

Another object of my invention is to construct the mixer in such a manner that the same can be easily and cheaply manufactured, yet at the same time be strong and durable.

Another object of my invention is to provide a mixer with means whereby a pan can be detachably secured thereto, and one that is provided with a mixing blade that can be raised in order to remove the pan without removing the mixer from the table.

Further objects of my invention will be readily apparent from the following detailed description thereof taken in connection with the accompanying drawings in which:

Figure 1 is a side view of my improved mixer and pan.

Fig. 4 is a modification, and

Fig. 5 is a perspective showing a detail hereinafter referred to.

Like numerals of references indicate similar parts throughout the several views of the drawings.

Figure 2:
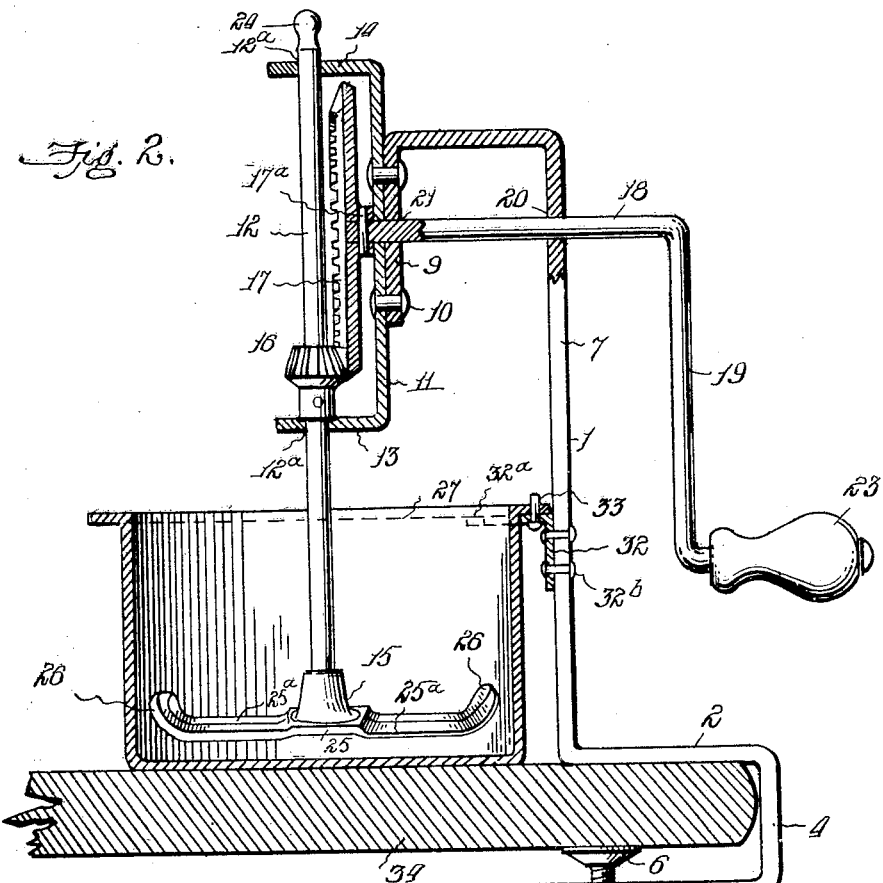
Fig. 2 is a side view of my mixer and pan showing the same as being secured to a table, with parts thereof in cross-section.

My mixer includes a frame 1, constructed from a single bar of metal bent to present spaced apart horizontal lower portions 2 3 connected by vertical portion 4 forming together with screw 5 and jaw 6 a table clamp, and a vertical standard 7 bent at its upper end to provide a support for the gearing mechanism hereinafter described and for this purpose presenting a downwardly directed supporting member 9. Secured to this downwardly directed supporting member by rivets 10 is a U-shaped sheet metal bearing member 11 provided with openings 12a in the horizontal arms 13 and 14 thereof to receive a shaft 12 carrying the stirrer 15 and bevel gear 16, the latter being fixed to the shaft and normally resting on the lower arm of the bearing member. Meshing with the aforesaid bevel gear and driving the same is a larger bevel gear 17 secured as by key 17a to a crank rod comprising shaft 18 and handle portion 19, the shaft being journaled in apertures 20 and 21 in standard 7 and supporting members 9, 11 while the outturned handle portion of said crank rod is provided with a hand-grasp 23 adapted to turn thereon, as usual in cranks of this type. The upper end of shaft 12 supported in the bearing member 11 is provided with a knob 24 for raising the shaft for the purpose hereinafter explained, and the stirrer 15 carried at the lower end of said shaft comprises a flat blade 25 provided at its ends with upwardly curved members 26 which assist in mixing the material in the deep pan or receptacle 27, and in order that this mixing blade may be forced to work in the lower part of the receptacle and keep the shaft in lowered position the edges 25a thereof in the direction of rotation are beveled as shown in the drawings. In the operation of the mixer or stirrer, I have found that it is desirable to provide a gear ratio of about five to one.

The deep mixing pan or receptacle 27, preferably of the shape shown in the drawings, is provided with a wide rim flange having a hole 32c therein to cooperate with means carried by the standard for firmly holding said receptacle in place, the holding means comprising a plate 32 firmly attached to the standard by rivets 32b and bent outwardly from the standard at its upper end to underlie the flange of the receptacle and having a pin 33 engaging the hole in the rim flange. The outwardly bent portion of the plate is cut away centrally as shown in Fig. 5 to present two bearing points 32a 32a at opposite ends thereof which engage the body of the receptacle immediately below the rim flange and serve to more firmly hold the receptacle in place, so that the stirrer blade will work in the center of said receptacle. A similar engaging member and pin may be and preferably is provided at the lower end of the attaching plate to receive a shallower receptacle.

Figure 3:
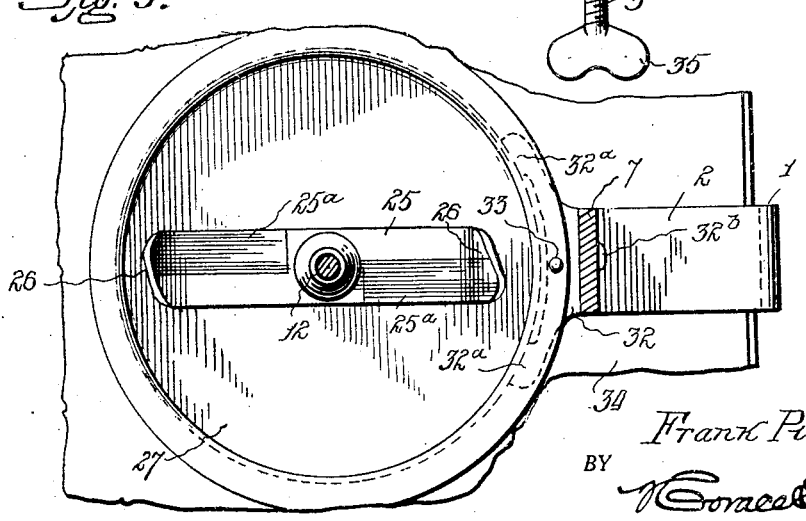
Fig. 3 is a top plan view.

When it is desired to mix a salad dressing or other ingredients the frame carrying the mixing device is clamped to table 34 by operating clamp screw 5, and shaft 12 can now be raised by grasping knob 24 to slide said shaft through openings 12a a sufficient distance so that the deep pan or receptacle 27 can be passed under the stirrer-blade at the lower end of the shaft and the inner end thereof slightly tilted to engage the pin 33 to thereby hold the receptacle in place, after which shaft 12 is lowered and the apparatus is ready for the mixing operation. It is therefore obvious that the pan may be inserted or removed without removing the operating mechanism of the mixer device from the table. Through the centrifugal force of the stirrer or mixing blade 15 the material is thoroughly agitated both at the side of the receptacle and center thereof and by reason of the upturned ends 26 being disposed diagonally with respect to the revolving motion of the blade, as shown in Figure 3, there is very rapid and thorough blending of the material or ingredients, taking about two or three minutes for mixing with a minimum amount of energy exerted.

It will be understood that the intermeshing gears are provided with deep cut teeth so that gear 16 will clear gear 17 when shaft 12 is raised, but should it be desired to use the ordinary form of shallow toothed gears, as shown in Fig. 4, shaft 12 is squared at its lower portion, as at 35, instead of being round, and is slidable in a square opening in the small gear or pinion 36, which latter in this instance has a journal 37 in the lower arm of the U-shaped supporting member forming the bearings for the shaft and pinion.

Other modifications of the embodiment of my invention herein disclosed will be obvious to those skilled in the particular art to which the invention appertains without departing from the spirit and scope of the appended claim, one instance of which being to make the operating mechanism of cast or forged metal instead of sheet metal.

I claim:

In a salad dressing mixer the combination with a supporting frame having spaced apart arms with bearings at their outer ends, a vertical stirrer-shaft supported in said bearings and having a sliding movement therein, a pinion secured to said vertical shaft, and a crank shaft carrying a gear-wheel in mesh with the pinion; of a bracket secured to the supporting frame and having a horizontal plate extended laterally at opposite sides of said supporting frame and curved in the arc of a circle at its inner edge, a pin projecting upwardly from the center of the plate, and a pan having an outwardly projecting rim flange at its upper edge adapted to overlie the plate with the inner curved edge of the latter bearing against the body of the pan, the aforesaid rim flange having a hole with which the pin on the bracket engages to hold the pan against the plate.

FRANK PICKARD.